US012333316B2

(12) United States Patent
Cao et al.

(10) Patent No.: US 12,333,316 B2
(45) Date of Patent: Jun. 17, 2025

(54) SELF-MANAGED CONFIGURATION OF INFORMATION TECHNOLOGY ASSETS IN AN INFORMATION TECHNOLOGY ENVIRONMENT

(71) Applicant: Dell Products L.P., Round Rock, TX (US)

(72) Inventors: Hui Cao, Shanghai (CN); Zhiguo Liu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 151 days.

(21) Appl. No.: 18/483,619

(22) Filed: Oct. 10, 2023

(65) Prior Publication Data

US 2025/0103352 A1    Mar. 27, 2025

(30) Foreign Application Priority Data

Sep. 27, 2023  (CN) .......................... 202311269785.8

(51) Int. Cl.
    *G06F 9/445*       (2018.01)
(52) U.S. Cl.
    CPC ................ *G06F 9/44505* (2013.01)
(58) Field of Classification Search
    CPC .................................................. G06F 9/44505
    USPC ............................................................ 713/1
    See application file for complete search history.

(56) References Cited

U.S. PATENT DOCUMENTS

| 5,432,941 A | * | 7/1995 | Crick | ................. G06F 9/44505 713/1 |
| 5,535,406 A | * | 7/1996 | Kolchinsky | ......... G06F 15/7867 712/10 |
| 5,666,534 A | * | 9/1997 | Gilbert | ................ G06F 11/0748 714/E11.193 |

(Continued)

OTHER PUBLICATIONS

Red Hat, "Understanding Ansible, Terraform,Puppet, Chef, and Salt," https://www.redhat.com/en/topics/automation/understanding-ansible-vs-terraform-puppet-chef-and-salt, Mar. 1, 2023, 7 pages.

(Continued)

*Primary Examiner* — Paul R. Myers
(74) *Attorney, Agent, or Firm* — Ryan, Mason & Lewis, LLP

(57) ABSTRACT

An apparatus comprises at least one processing device configured to deploy, at a given one of a plurality of information technology assets in an information technology infrastructure environment, an instance of a self-managed information technology asset configuration tool. The at least one processing device is also configured to determine, utilizing the instance of the self-managed information technology asset configuration tool deployed on the given information technology asset, a logical dispatch order for performing configuration operations for at least one of the plurality of information technology assets in the information technology infrastructure environment, wherein the logical dispatch order operates recursively across two or more levels of a processing hierarchy. The at least one processing device is further configured to perform, utilizing the instance of the self-managed information technology asset configuration tool deployed on the given information technology asset, the configuration operations in accordance with the determined logical dispatch order.

20 Claims, 9 Drawing Sheets

(56) References Cited

U.S. PATENT DOCUMENTS

| | | | | |
|---|---|---|---|---|
| 7,155,534 B1* | 12/2006 | Meseck | H04L 41/0873 | 709/240 |
| 7,356,432 B1* | 4/2008 | Lang | G06F 11/263 | 702/117 |
| 9,560,132 B1* | 1/2017 | Shanmugam | H04L 67/01 | |
| 10,395,410 B2* | 8/2019 | Dorie | G06T 13/40 | |
| 10,534,701 B1* | 1/2020 | Pande | G06F 16/284 | |
| 2001/0034771 A1* | 10/2001 | Hutsch | H04L 61/30 | 709/217 |
| 2006/0282449 A1* | 12/2006 | Rath | G06F 9/5061 | |
| 2008/0115059 A1* | 5/2008 | Sakai | G06F 3/1204 | 715/700 |
| 2008/0125877 A1* | 5/2008 | Miller | G05B 15/02 | 707/999.107 |
| 2010/0199223 A1* | 8/2010 | Colner | G06F 16/26 | 715/853 |
| 2013/0097319 A1* | 4/2013 | Ahmad | H04L 41/5054 | 709/226 |
| 2015/0154855 A1* | 6/2015 | Boisclair | G08B 25/14 | 340/506 |
| 2017/0085463 A1* | 3/2017 | Lih | H04L 45/64 | |
| 2017/0096127 A1* | 4/2017 | Zhang | B60T 8/17551 | |
| 2025/0081142 A1* | 3/2025 | Hasegawa | G01S 19/34 | |

OTHER PUBLICATIONS

S. Sryheni, "Introduction to Depth First Search Algorithm (DFS)," https://www.baeldung.com/cs/depth-first-search-intro, Mar. 24, 2023, 16 pages.

K. Parham, "Get Seasoned with SaltStack," https://blog.devops.dev/get-seasoned-with-saltstack-1f98c309cf7c, Dec. 5, 2022, 14 pages.

C. Edwards, "ZeroMQ," https://intothesaltmine.readthedocs.io/en/latest/chapters/command-and-control/zeromq.html, Accessed Oct. 9, 2023, 3 pages.

* cited by examiner

SELF-MANAGED CONFIGURATION OF INFORMATION TECHNOLOGY ASSETS IN AN INFORMATION TECHNOLOGY ENVIRONMENT

RELATED APPLICATION

The present application claims priority to Chinese Patent Application No. 202311269785.8, filed Sep. 27, 2023 and entitled "Self-Managed Configuration of Information Technology Assets in an Information Technology Environment," which is incorporated by reference herein in its entirety.

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices. Support platforms may also provide functionality for testing managed computing devices.

SUMMARY

Illustrative embodiments of the present disclosure provide techniques for self-managed configuration of information technology assets in an information technology environment.

In one embodiment, an apparatus comprises at least one processing device comprising a processor coupled to a memory. The at least one processing device is configured to deploy, at a given one of a plurality of information technology assets in an information technology infrastructure environment, an instance of a self-managed information technology asset configuration tool. The at least one processing device is also configured to determine, utilizing the instance of the self-managed information technology asset configuration tool deployed on the given information technology asset, a logical dispatch order for performing configuration operations for at least one of (i) the given information technology asset and (ii) one or more other ones of the plurality of information technology assets in the information technology infrastructure environment, wherein the logical dispatch order operates recursively across two or more levels of a processing hierarchy. The at least one processing device is further configured to perform, utilizing the instance of the self-managed information technology asset configuration tool deployed on the given information technology asset, the configuration operations in accordance with the determined logical dispatch order.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
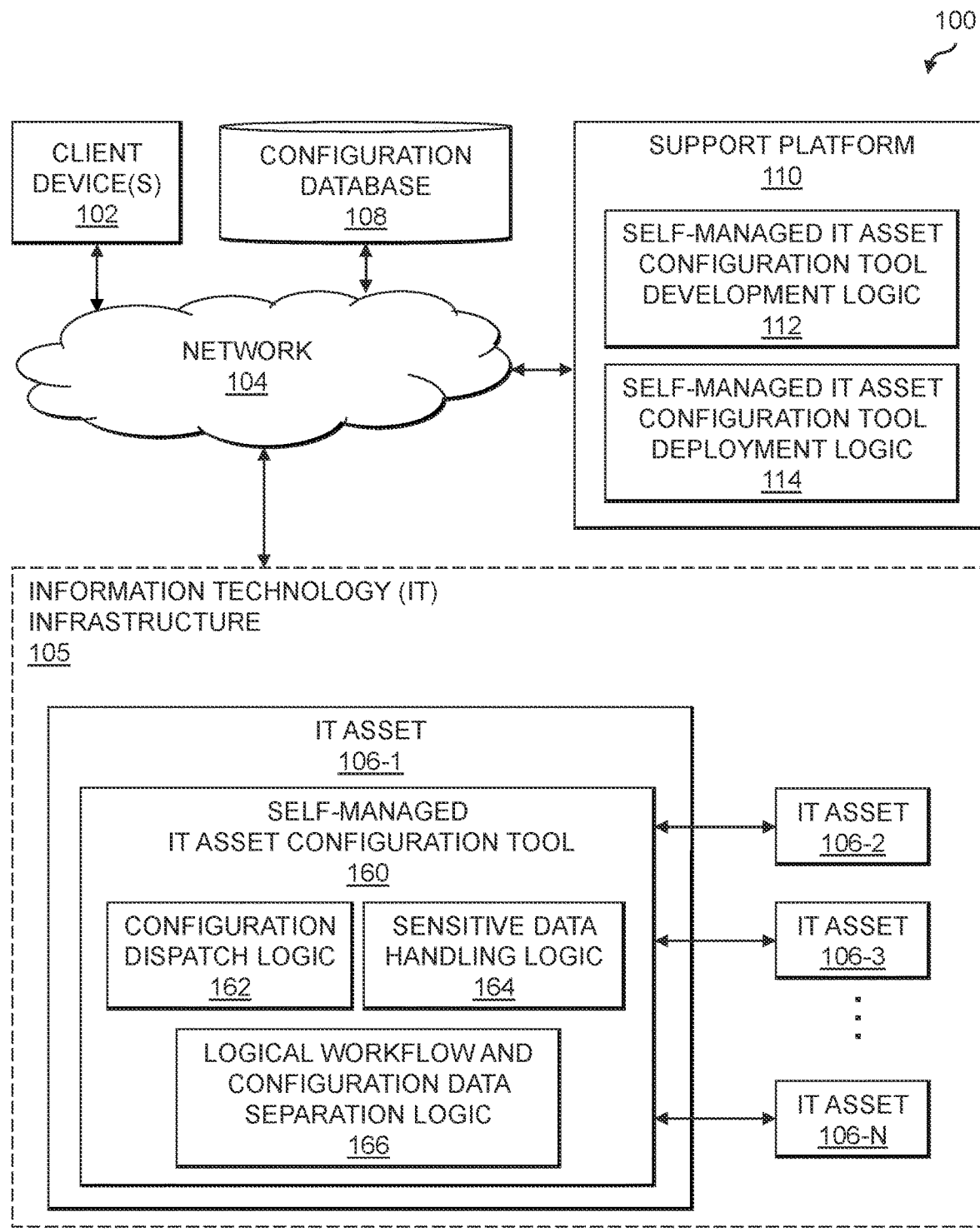
FIG. 1 is a block diagram of an information processing system configured for self-managed configuration of information technology assets in an information technology environment in an illustrative embodiment.

FIG. 1 shows an information processing system 100 configured in accordance with an illustrative embodiment. The information processing system 100 is assumed to be built on at least one processing platform and provides functionality for self-managed configuration of information technology (IT) assets in an IT environment such as a distributed system (DS) cluster. As used herein, the term "self-managed configuration" refers to configuration which may be performed by any arbitrary one of a set of IT assets, without requiring any dedicated "master" node. The information processing system 100 includes one or more client devices 102 which are coupled to a network 104. Also coupled to the network 104 is an information technology (IT) infrastructure 105 comprising a set of IT assets 106-1, 106-2, 106-3, . . . 106-N (collectively, IT assets 106), a configuration database 108, and a support platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the support platform 110 is used for an enterprise system. For example, an enterprise may subscribe to or otherwise utilize the support platform 110 for managing IT assets 106 of the IT infrastructure 105 operated by that enterprise. Users of the enterprise (e.g., software developers, test engineers or other employees, customers or users which may be associated with different ones of the client devices 102) may utilize the support platform 110 to develop and deploy self-managed IT asset configuration tools to one or more of the IT assets 106. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. In some embodiments, it is assumed that the IT assets 106 of the IT infrastructure 105 are part of a separate local network which may be used for automated configuration using the self-managed IT asset configuration tool 160.

The configuration database 108 is configured to store and record various information that is utilized by the support platform 110 and/or the self-managed IT asset configuration tool 160. Such information may include, for example, dispatch configuration files for controlling dispatch at different layers or levels (e.g., a base level, a domain level, a module level). Such information may also include schema rules used for determining how to separate logical workflow configuration and configuration data, rules for handling sensitive data, etc. In some embodiments, one or more storage systems utilized to implement the configuration database 108 comprise a scale-out all-flash content addressable storage array or other type of storage array. Various other types of storage systems may be used, and the term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

The support platform 110 may be provided as a cloud service that is accessible by one or more of the client devices 102 to allow users thereof to develop and deploy self-managed IT asset configuration tools on the IT assets 106 of the IT infrastructure 105. In some embodiments, the client devices 102 are assumed to be associated with system administrators, IT managers or other authorized personnel responsible for managing the IT assets 106. In some embodiments, the IT assets 106 of the IT infrastructure 105 are owned or operated by the same enterprise that operates the support platform 110. In other embodiments, the IT assets 106 of the IT infrastructure 105 may be owned or operated by one or more enterprises different than the enterprise which operates the support platform 110 (e.g., a first enterprise provides support for multiple different customers, business, etc.). Various other examples are possible.

In some embodiments, the client devices 102 and/or the IT assets 106 of the IT infrastructure 105 may implement host agents that are configured for automated transmission of information to/from the support platform 110, or to/from instances of the self-managed IT asset configuration tool 160. It should be noted that a "host agent" as this term is generally used herein may comprise an automated entity, such as a software entity running on a processing device. Accordingly, a host agent need not be a human entity.

The support platform 110 and the IT assets 106 in the FIG. 1 embodiment are assumed to be implemented using at least one processing device. Each such processing device generally comprises at least one processor and an associated memory, and implements one or more functional modules or logic for controlling certain features of the support platform 110 or the IT asset 106. In the FIG. 1 embodiment, the support platform 110 implements self-managed IT asset configuration tool development logic 112 and self-managed IT asset configuration tool deployment logic 114. The self-managed IT asset configuration tool development logic 112 is configured to provide an interface (e.g., a graphical user interface (GUI)) allowing users of the client devices 102 to define or otherwise develop one or more self-managed IT asset configuration tools, possibly based on information stored in the configuration database 108. The self-managed IT asset configuration tool deployment logic 114 allows users of the client devices 102 to deploy developed self-managed IT asset configuration tools to one or more of the IT assets 106 of the IT infrastructure 105. In the FIG. 1 example, a self-managed IT asset configuration tool 160 is deployed on IT asset 106-1, and is used to automatically configure other ones of the IT assets 106 (e.g., IT assets 106-2, 106-3, . . . 106-N). It should be noted, however, that multiple instances of the self-managed IT asset configuration tool 160 may be deployed on multiple ones of the IT assets 106 as desired. There is no requirement for using a single one of the IT assets 106 as a "management" node for the IT infrastructure 105. Instead, any of the IT assets 106 to which the self-managed IT asset configuration tool 160 is deployed may use its instance of the tool to automatically configure one or more other ones of the IT assets 106 (e.g., ones of the IT assets 106 which are newly added, which have become corrupted and need to be restored, etc.).

In the FIG. 1 embodiment, an instance of the self-managed IT asset configuration tool 160 is deployed on the IT asset 106-1. The self-managed IT asset configuration tool 160 implements configuration dispatch logic 162, sensitive data handling logic 164, and logical workflow and configuration data separation logic 166. The configuration dispatch logic 162 is configured to determine a logical dispatch order for configuration operations across two or more levels of a processing hierarchy, where the configuration operations may operate recursively across the two or more levels of the processing hierarchy. The sensitive data handling logic 164 is configured to validate components of a system configuration which include sensitive data, such as license data, encrypted data, etc. The logical workflow and configuration data separation logic 166 is configured to control how configuration data (e.g., user data) at a module level of the processing hierarchy is reconstructed in accordance with Representational State Transfer (RESTful) scheme rules independent of the logical workflow (e.g., the determined logical dispatch order).

At least portions of the self-managed IT asset configuration tool development logic 112, the self-managed IT asset configuration tool deployment logic 114, the self-managed IT asset configuration tool 160, the configuration dispatch logic 162, the sensitive data handling logic 164, and the logical workflow and configuration data separation logic 166 may be implemented at least in part in the form of software that is stored in memory and executed by a processor.

It is to be appreciated that the particular arrangement of the client devices 102, the IT infrastructure 105, the configuration database 108 and the support platform 110 illustrated in the FIG. 1 embodiment is presented by way of example only, and alternative arrangements can be used in other embodiments. As discussed above, for example, the support platform 110 (or portions of components thereof, such as one or more of the self-managed IT asset configuration tool development logic 112 and the self-managed IT asset configuration tool deployment logic 114) may in some embodiments be implemented internal to one or more of the client devices 102 and/or the IT infrastructure 105. Further, multiple instances of the self-managed IT asset configuration tool 160 (or portions or components thereof, such as one or more of the configuration dispatch logic 162, the sensitive data handling logic 164, and the logical workflow and configuration data separation logic 166) may be deployed on multiple ones of the IT assets 106 as desired. The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, the IT infrastructure 105, the configuration database 108 and the support platform 110 or components thereof may be implemented on respective distinct processing platforms, although numerous other arrangements are possible. For example, in some embodiments at least portions of the support platform 110 and one or more of the client devices 102, the IT infrastructure 105 and/or the configuration database 108 are implemented on the same processing platform. A given one of the client devices 102 can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, the IT assets 106, the configuration database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 8 and 9.

It is to be understood that the particular set of elements shown in FIG. 1 for self-managed configuration of IT assets in an IT environment is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
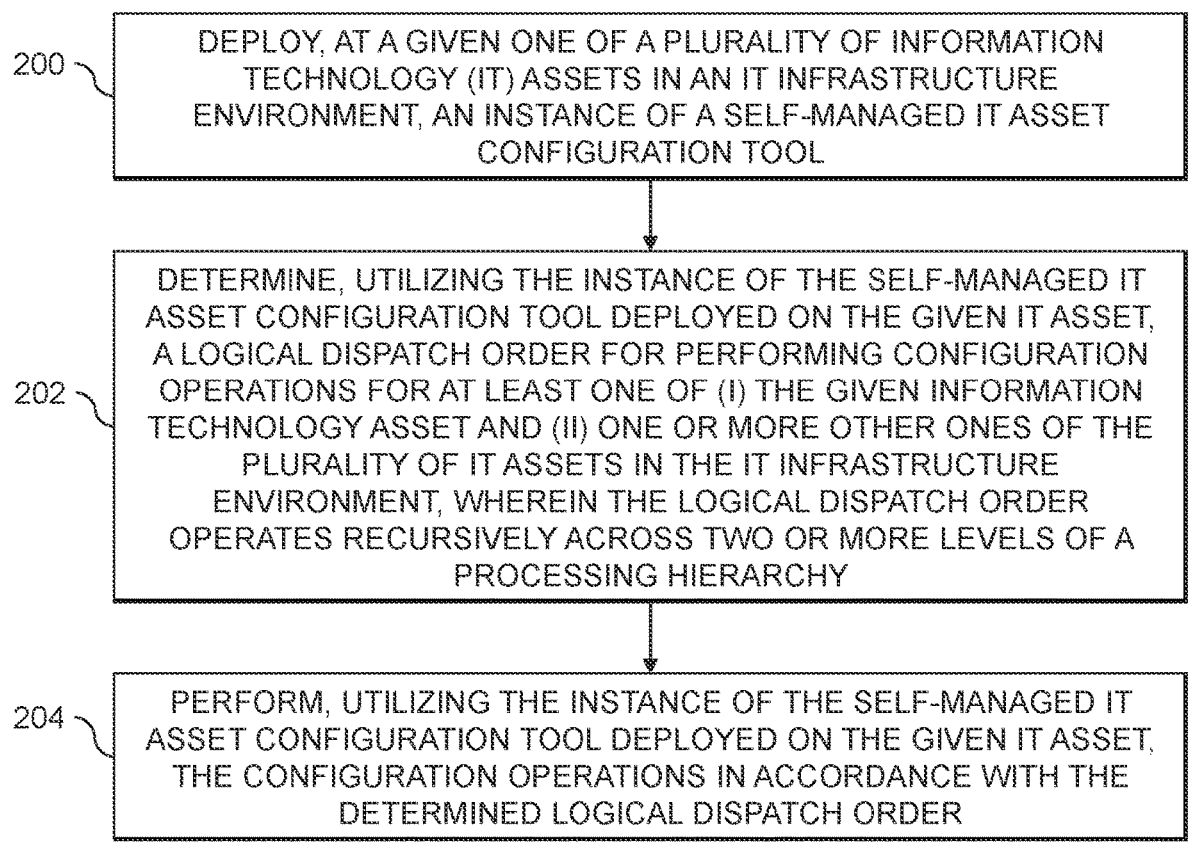
FIG. 2 is a flow diagram of an exemplary process for self-managed configuration of information technology assets in an information technology environment in an illustrative embodiment.

An exemplary process for self-managed configuration of IT assets in an IT environment will now be described in more detail with reference to the flow diagram of FIG. 2. It is to be understood that this particular process is only an example, and that additional or alternative processes for self-managed configuration of IT assets in an IT environment may be used in other embodiments.

In this embodiment, the process includes steps 200 through 204. These steps are assumed to be performed by the self-managed IT asset configuration tool 160 utilizing the configuration dispatch logic 162, the sensitive data handling logic 164, and the logical workflow and configuration data separation logic 166. The process begins with step 200, deploying an instance of a self-managed IT asset configuration tool (e.g., self-managed IT asset configuration tool 160) at a given one (e.g., IT asset 106-1) of a plurality of IT assets (e.g., IT assets 106) in an IT infrastructure environment (e.g., IT infrastructure 105). The given IT asset may be any arbitrary one of the plurality of IT assets in the IT infrastructure environment (e.g., the given IT asset does not need to be a dedicated "management" node). One or more additional instances of the self-managed IT asset configuration tool may be deployed on one or more other arbitrary ones of the plurality of IT assets in the IT infrastructure environment. In step 202, the instance of the self-managed IT asset configuration tool deployed on the given IT asset is utilized to determine a logical dispatch order for performing configuration operations for at least one of (i) the given IT asset and (ii) one or more other ones of the plurality of IT assets in the IT infrastructure environment. The logical dispatch order operates recursively across two or more levels of a processing hierarchy. The configuration operations are performed in step 204 in accordance with the determined logical dispatch order utilizing the instance of the self-managed IT asset configuration tool deployed on the given IT asset. In some embodiments, the plurality of IT assets are part of a distributed system cluster, and the configuration operations are performed over a local network interconnecting the plurality of IT assets in the distributed system cluster.

The configuration operations may comprise, for the at least one of (i) the given IT asset and (ii) the one or more other ones of the plurality of IT assets in the IT infrastructure environment, a restore configuration operation for provisioning a configuration on the at least one of (i) the given IT asset and (ii) the one or more other ones of the plurality of IT assets in the IT infrastructure environment. The logical dispatch order for the restore configuration operation may operate recursively from a lowest one of the two or more levels of the processing hierarchy to a highest one of the two or more levels of the processing hierarchy. The configuration operations may alternatively comprise, for the at least one of (i) the given IT asset and (ii) the one or more other ones of the plurality of IT assets in the IT infrastructure environment, a delete configuration operation for removing a configuration previously provisioned on the at least one of (i) the given IT asset and (ii) the one or more other ones of the plurality of IT assets in the IT infrastructure environment. The logical dispatch order for the delete configuration operation may operate recursively from a highest one of the two or more levels of the processing hierarchy to a lowest one of the two or more levels of the processing hierarchy.

The logical dispatch order may operate recursively across the two or more levels of the processing hierarchy utilizing a Depth First Search Recursion (DFSR) algorithm. The two or more levels of the processing hierarchy may comprise, for a specified type of IT asset: a first level specifying a first logical dispatch sequence for two or more base system components, each of the two or more base system components affecting overall behavior of the specified type of IT asset; a second level specifying a second logical dispatch sequence for two or more domains, the two or more domains each comprising one or more domain system components, the two or more domains comprising at least a first domain having one or more dependencies with at least a second domain; and a third level specifying a third logical dispatch sequence for two or more modules, each of the two or more modules being associated with at least one of the domain system components. The first, second and third logical dispatch sequences may be defined in JavaScript Object Notation (JSON) setup files. The third logical dispatch sequence may specify, for a given one of the two or more modules, that configuration data coming from one or more of the domain system components associated with the given module be processed in accordance with a set of Representational State Transfer (RESTful) request schema rules for reconstructing user data to instantiate a configuration of the given module. The third logical dispatch sequence may specify, for a given one of the two or more modules associated with two or more domain system components, utilization of idempotent processing operations allowing reentry configuration to a same entry point of the given module for each of the two or more domain system components.

Performing the configuration operations in accordance with the determined logical dispatch order may comprise identifying one or more components of a system configuration comprising sensitive data and validating the identified one or more components of the system configuration prior to processing the identified one or more components of the system as specified in the determined logical dispatch order. The sensitive data may comprise at least one of license data and encrypted data.

Development and Operations (DevOps) tools may be used in Continuous Integration Continuous Delivery (CICD) systems. DevOps tools may provide a platform for deploying and configuring servers or other IT assets automatically, especially for large groups of servers or other IT asset (e.g., server or other IT asset clusters). Illustrative embodiments provide technical solutions for automatic configuration of servers or other IT assets among distributed system (DS) clusters. In some embodiments, one or more Representational State Transfer (REST) application programming interfaces (APIs) are used, with a RESTful module of auto configuration of backup and/or restore operations for servers or other IT assets in DS clusters. Advantageously, some embodiments do not require the use of a "master" control module, and can thus easily replace any DevOps configuration management approach. Further, while various embodiments are described with respect to DS clusters, the technical solutions described herein may more broadly applied to servers or other IT assets which are not part of DS clusters.

Figure 3:
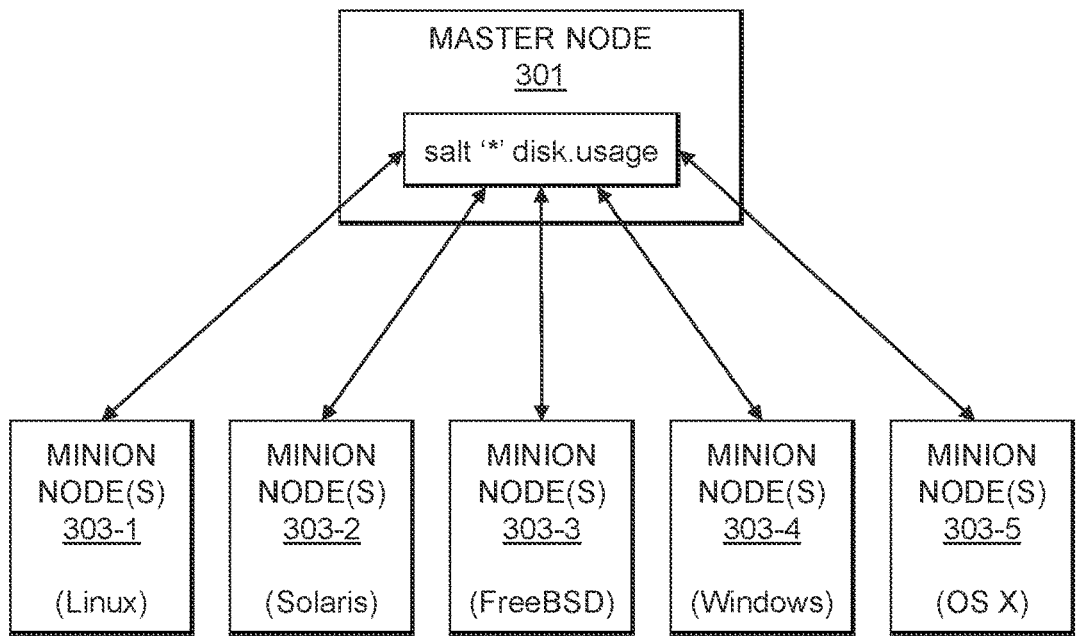
FIG. 3 shows a master node which manages the configuration of a set of minion nodes in an illustrative embodiment.
Figure 3:
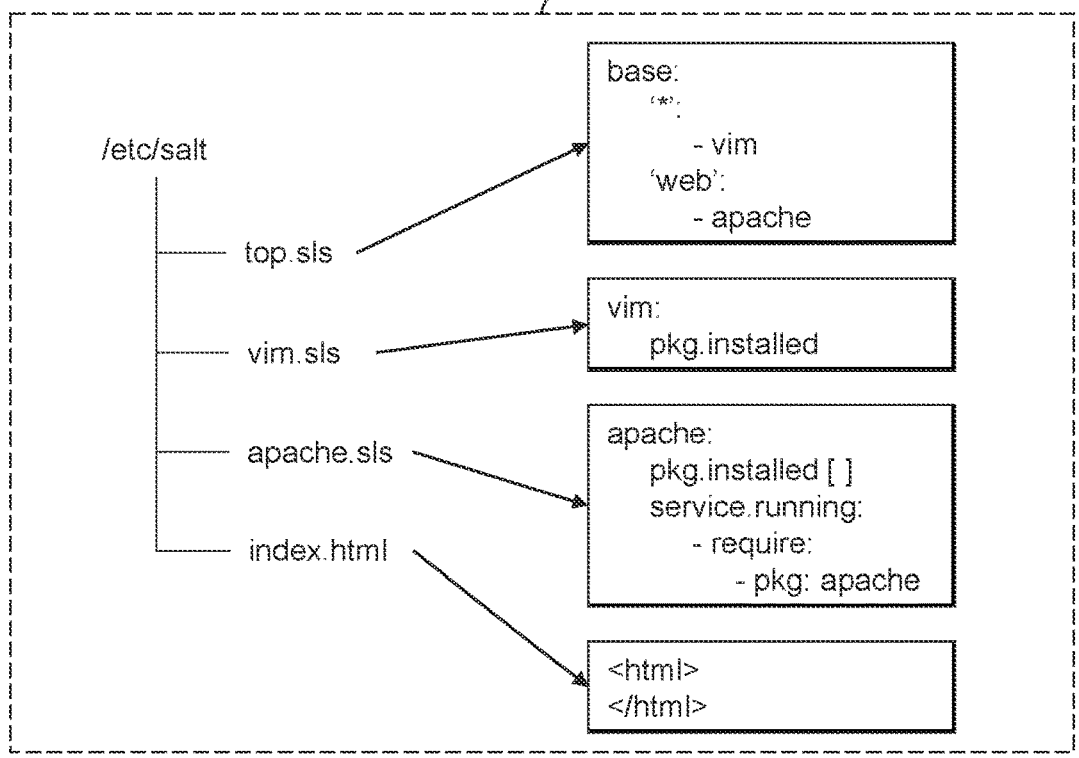

In one approach, DevOps tools may be used to manage a group of servers or other IT assets with a group of configuration files, like salt files, by defining setup files to perform configuration operations. The salt master is a primary controller (e.g., a "master" node) which is not allowed to go offline. Given salt as an example, the salt master sends commands to "minion" nodes (e.g., through ZeroMQ), and the minion nodes will read commands from a messaging queue (MQ) bus and then handover to minion handlers to execute the commands. After the commands are executed, a result is returned back to the master node through the MQ bus. A salt client round-robin walk job is performed, with job results being output to a virtual console (e.g., a TTY console). FIG. 3 shows a system 300 implementing this approach, with a master node 301 in communication with various minion nodes 303-1, 303-2, 303-3, 303-4, and 303-5 running different platforms (e.g., Linux, Solaris, FreeBSD, Windows and OS X, respectively). FIG. 3 also shows the salt file 310 used. Most DevOps tools (e.g., puppet, ansible, chef, etc.) work with this approach. An advantage of this approach is that, when dealing with a huge group of servers or other IT assets in a cluster, the DevOps platform can perform configuration, backup or restore with high efficiency. This approach, however, also has various disadvantages, including the complexity of setting up the DevOps platform. Another disadvantage of this approach is that management is highly reliant on the master node. If the master node crashes or otherwise goes offline, the whole service platform will not be able to manage configuration, backup and restore for the servers or other IT assets. Still another disadvantage is that configuration of the master node may be reliant on externally initiated behavior over one or more public networks. This exposes operations to the public and presents security risks.

Illustrative embodiments provide technical solutions for configuration, backup and restore of servers or other IT assets which do not depend on any "master" node. Instead, the technical solutions enable configuration, backup and restore to be performed in a local network without exposing data to the public, and allow for automatic configuration of servers or other IT assets (e.g., in DS clusters). In some embodiments, a RESTful module is provided to backup and/or restore system configurations among different servers or other IT assets, also referred to as nodes, in a cluster. The technical solutions greatly simplify configuration operations compared to use of DevOps tools. It should be noted, however, that the technical solutions can be used in conjunction with DevOps tools, such as where DevOps tools perform management functions using the RESTful API calls. By realizing RESTful API calling, the technical solutions described herein can store system configurations and data into files or databases, and users can encrypt sensitive data and then read and decrypt data with POST/PUT RESTful API operations to restore the data back on a system. The technical solutions advantageously provide an approach for implementing a backup and restore module utilizing RESTful APIs for many realms.

Figure 4:
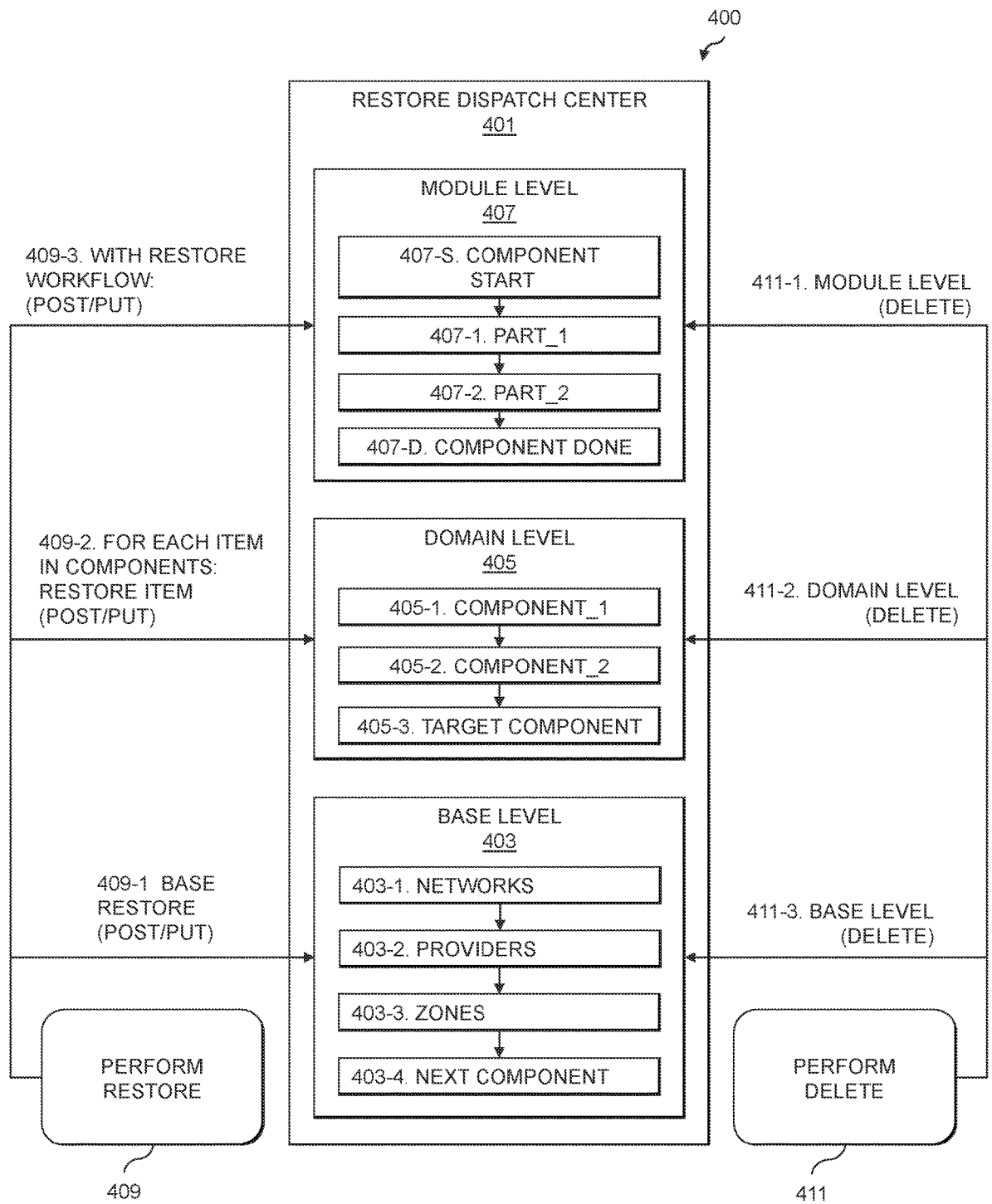
FIG. 4 shows a restore dispatch center configured for performing restore and delete configuration operations in an illustrative embodiment.

A common module, referred to herein as a Restore Dispatch Center (RDC), is designed to solve coupling and cross-coupling of components. FIG. 4 shows a system 400 implementing a RDC 401 with three processing levels (also referred to as processing layers)—a base level or layer 403, a domain level or layer 405, and a module level or layer 407. An IT asset has a base level configuration, a component level configuration, and a module level configuration. This means that, when configuring the IT asset, processing should start from the lowest layer and proceed in turn to upper layers in a hierarchy (e.g., start at the base level 403, then proceed to the domain level 405 and then to the module level 407). When erasing configuration of the IT asset, processing should start in reverse from the highest layer and proceed in turn to lower layers in the hierarchy (e.g., start at the module level 407, then proceed to the domain level 405 and then to the base level 403). The RDC 401 is configured with mappings to follow these rules, and is designed to focus on managing the whole workflow logically.

The base level 403 handles IT asset base configurations, which affects the whole IT asset behaviors. For example, network configuration enables the IT asset to access other IT assets through one or more networks. Operators should identify which components operate at the base level 403, and then define them in one or more base level 403 setup files (e.g., one or more JavaScript Object Notation (JSON) files) together with their dispatch logical sequence. In the FIG. 4 example, the base level 403 dispatch logical sequence includes networks 403-1, providers 403-2, zones 403-3 and next component 403-4. It should be noted that there may be more or fewer base level 403 components in the dispatch logical sequence before reaching the next component 403-4.

The domain level 405 handles domain field configurations. The domain field may comprise many components. Similar to the base level 403, operators may identify components which operate at the domain level 405, and then define them in one or more domain level 405 setup files (e.g., one or more JSON files) together with their dispatch logical sequence. The difference at the domain level 405 is that dependencies may exist between domains, or between components within a domain. Such dependencies should be defined in the domain level 405 setup file, and the RDC 401 will follow the dependency logic to perform domain level 405 configurations. In the FIG. 4 example, the domain level 405 dispatch logical sequence includes component 1 405-1, component 2 405-2, and target component 405-3. It should be noted that there may be more or fewer components in the dispatch logical sequence before reaching the target component 405-3.

The module level 407 handles module configurations. A module may be part of one or more components. The module level 407 is important to the overall workflow, and processes configuration data coming from domain components at the domain level 405 and reconstructs user data to meet RESTful request schema to perform configuration operations. Inside the module level 407, there may be both logical workflow configuration and configuration or user data blended together. How to resolve this blend of logical workflow configuration and configuration or user data will be discussed in further detail below. Operators may define the different modules in one or more module level 407 setup files (e.g., one or more JSON files) together with their dispatch logical sequence. In the FIG. 4 example, the module level 407 dispatch logical sequence includes component start 407-S, part 1 407-1, part 2 407-2, and component done 407-D. It should be noted that there may be more or fewer parts between the component start 407-S and the component done 407-D.

The different setup files (e.g., JSON files) for the base level 403, the domain level 405 and the module level 407 determine the whole logical behavior of configuration (e.g., backup, restore, delete) workflows. By modifying the setup files, a user can easily change the configuration workflow dynamically without changing any code.

FIG. 4 further shows a perform restore operation 409 and a perform delete operation 411. The perform restore operation 409 includes base restore 409-1 using the base level 403. The perform restore operation 409 also includes, for each item in a components list, restoring 409-2 that item using the domain level 405. The perform restore operation 409 further includes a restore workflow 409-3 using the module level 407. Each of 409-1, 409-2 and 409-3 may use one or more POST/PUT REST API calls. The perform delete operation 411 includes module level deletion 411-1, domain level deletion 411-2, and base level deletion 411-3. Each of 411-1, 411-2 and 411-3 may use one or more DELETE REST API calls.

The base level 403, the domain level 405 and the module level 407 work with each other and across components using one or more algorithms implemented by the RDC 401. In some embodiments, the RDC 401 uses a Depth First Search Recursion (DFSR) algorithm which starts at the base level 403, and proceeds from the base level 403 to the domain level 405 and then to the module level 407 components. Some components have cross-dependencies, and based on DFSR the RDC 401 will process dependent module level 407 components. After module level 407 configurations are done, the RDC 401 will recursively proceed back to the domain level 405 and then to the base level 403. If the base level 403 has dependency modules, the RDC 401 will also process such dependency modules to finish pre-acquisition configurations and then proceed back to the beginning. Advantageously, it does not matter which layer or component processing begins at because the DFSR algorithm will find any dependencies and then proceed back to the entry. Thus, the DFSR algorithm will always be able to finish the configuration on a target component.

Figure 5:
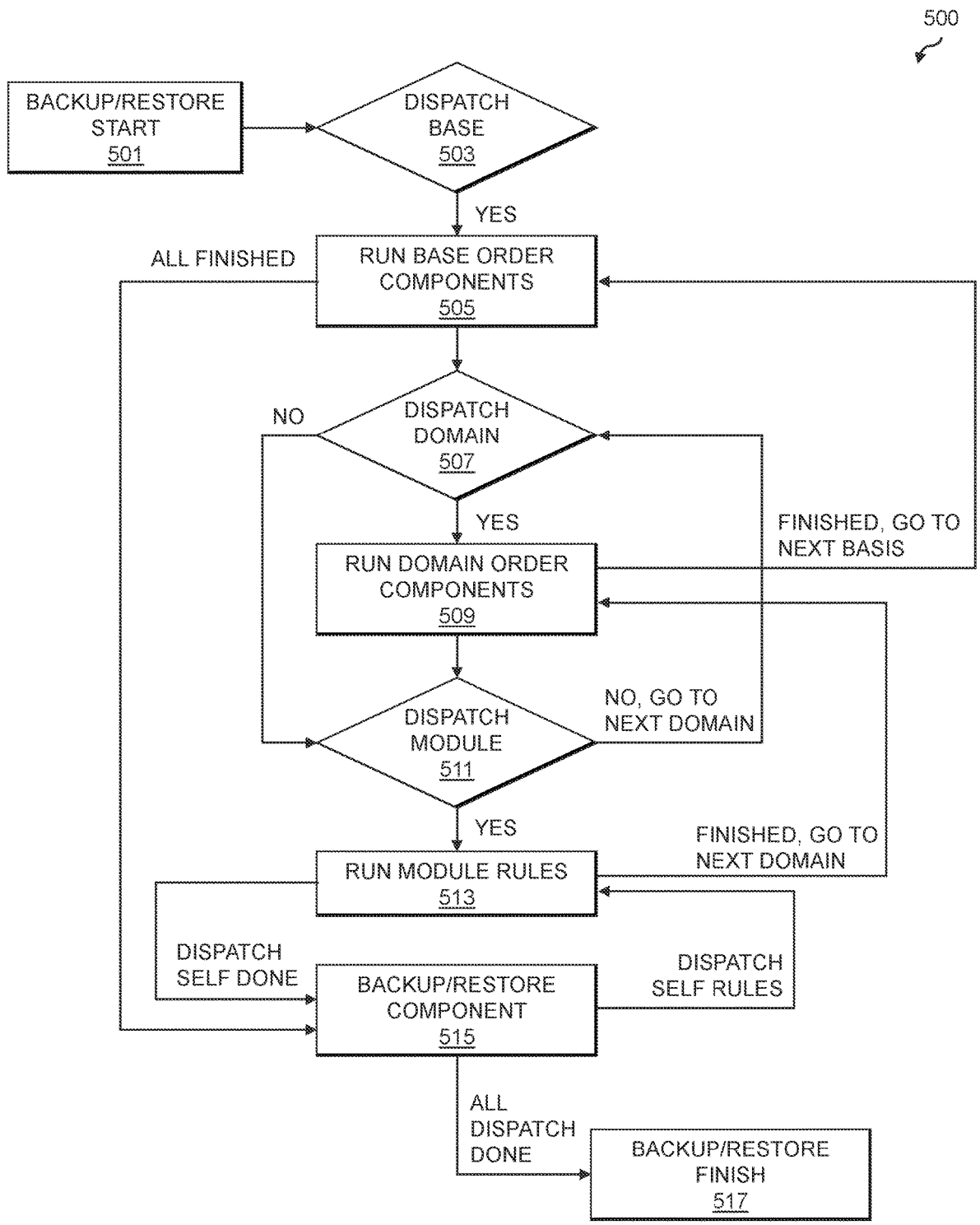
FIG. 5 shows a depth first search recursion process flow for operating a restore dispatch center in an illustrative embodiment.

FIG. 5 shows a process flow 500 for implementing DFSR algorithm routing with the RDC 401. The process flow 500 begins with starting a backup/restore operation in step 501, and proceeding to dispatch in the base level 403 in step 503. In step 505, base order components are run. It should be noted that step 505 may iterate one or more times until all base order components have been run. In step 507, a decision is made as to whether to proceed with dispatch in the domain level 405. If the result of step 507 is yes, domain order components are run in step 509. It should be noted that step 509 may iterate one or more times until all domain order components have been run. If the result of step 507 is no or following step 509, the process flow 500 proceeds to step 511 where a decision is made as to whether to proceed with dispatch in the module level 407. If the result of step 511 is yes, module rules are run in step 513. This includes obtaining rules for dispatching the module currently being processed (e.g., "dispatch self rules") from backup/restore component 515 and then dispatching the module currently being processed. Once finished, an acknowledgement for the module currently being processed (e.g., "dispatch self done") is provided to the backup/restore component 515. As noted above, step 513 may iterate one or more times until all module order components have been run. When step 513 is finished, the process flow 500 proceeds to the next domain and returns to step 507. When the domain order components are finished in step 509, the process flow 500 proceeds to the next base and returns to step 505. When all base order components are finished in step 505, the process flow 500 proceeds to the backup/restore component 515. When the backup/restore component 515 determines that all dispatch is done, the backup/restore operation is finished in step 517.

Processing for resolving reconfiguration conflicts when cross-decoupling components will now be described. When the DFSR algorithm processes cross-components, it will proceed back to the starting module after dependency configuration is done. Under this circumstance, some module configurations may have the chance of being reconfigured many times, which is called Reentry Configuration (RC). To allow RC, some embodiments use PUT first then POST operations, since PUT operations are idempotent and allow RC to the same entry point. Now processing cross-components is no longer an issue when jumping between dependency modules. After multiple RC occurrences happen to a target component, the target component will always finish its configuration. The next difficulty is, when processing cross-dependencies, how to handle the logical configuration. This may blend into cross-component workflows and become extremely intricate.

Figure 6:
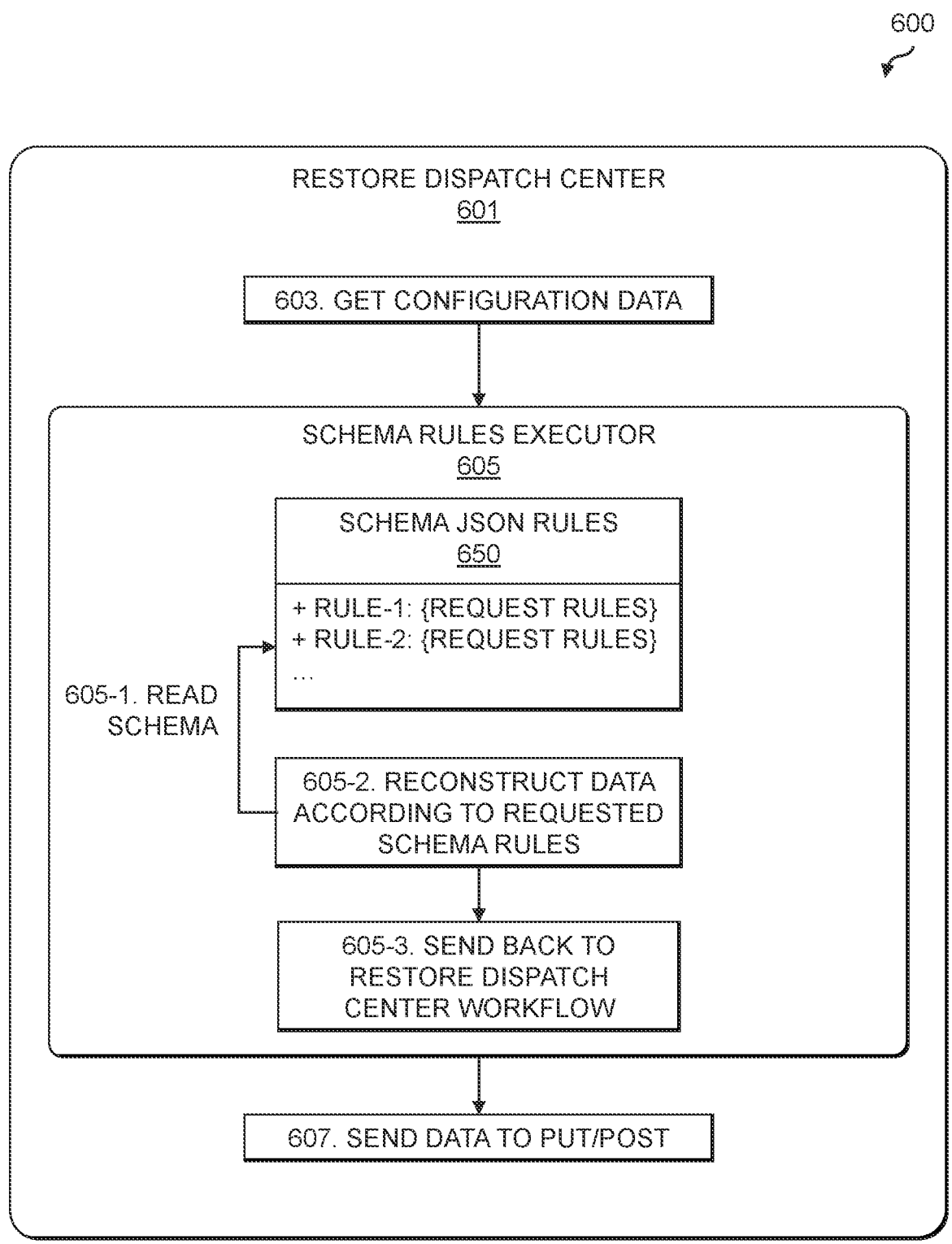
FIG. 6 shows a restore dispatch center configured with a schema rules extractor for separation of logical workflow configuration and configuration data in configuration operations in an illustrative embodiment.

Handling blending of the logical configuration and configuration data will now be described. To solve logical and data blending, some embodiments split the logical configuration from the configuration data. A Scheme Rules Executor (SRE) is designed to handle such issues. FIG. 6 shows an example of a system 600 comprising an RDC 601 which implements an SRE 605 (e.g., which works at the module level 407 of the overall RDC workflow). When a user proceeds with configuration workflows, user data is obtained in block 603 and then fed to the SRE 605. Inside the SRE 605, only the configuration data is processed to meet the RESTful request schema of the module which is currently being processed. Each module can define its own data schema process rules (e.g., shown as schema JSON rules 650 in the FIG. 6 example). The SRE 605 in block 605-1 reads from the set of schema JSON rules 650 (e.g., for the module currently being processed) and in block 605-2 reconstructs the data to fulfill the RESTful request scheme as specified by the rules read in block 605-1. The reconstructed data is then sent back to the overall RDC workflow in block 605-3. The data is then sent via RESTful PUT/POST operations in step 607. Thus, the logical configuration workflow is fully split from the configuration data. The RDC 601 controls the logical workflow while the SRE 605 only reconstructs the configuration data.

Figure 7:
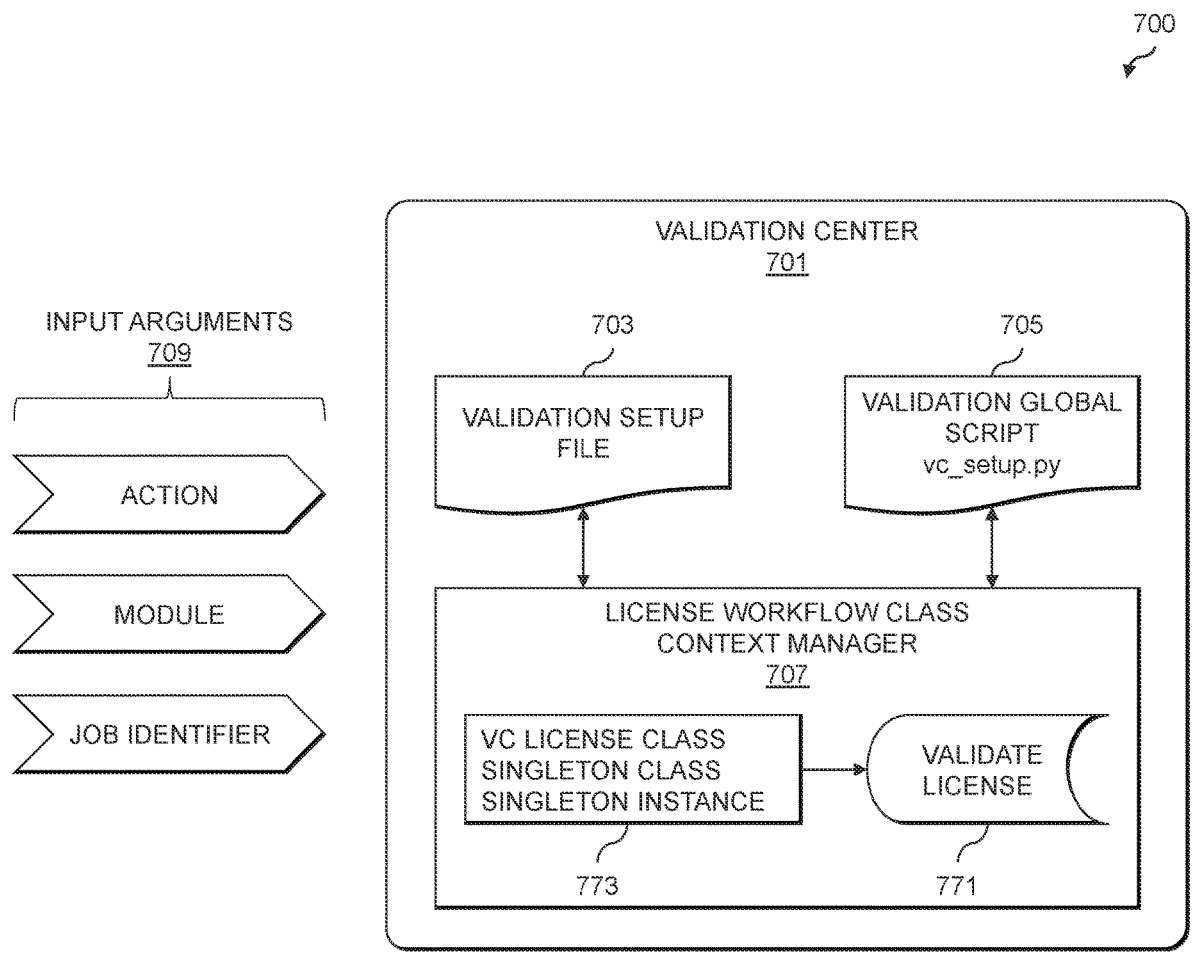
FIG. 7 shows a validation center configured for handling sensitive data in configuration operations in an illustrative embodiment.

Handling of sensitive data will now be described. A system or other IT asset may include various sensitive data, such as license data, SPN data, certification data, etc. A validation center (VC) is designed to support validation functionality for handling of sensitive data (e.g., license validation, certification validation, sensitive data encryption/decryption, etc.). The VC may use a mapping table to indicate features and sensitive data. The mapping table defines what needs to be treated as sensitive data, what needs to be validated based on the features, what data should be encrypted/decrypted for users, etc. The mapping table may be edited so that the VC can easily adapt to changes without requiring code changes, allowing an operator to easily manage all applicable rules. The VC may operate or work ahead of a configuration workflow, and any component may be processed through the VC before the configuration workflow starts. Based on VC rules, different validations and/or data encryption/decryption are performed. FIG. 7 shows a system 700 implementing a VC 701 for license validation, including a validation setup file 703 (e.g., a JSON file) and a validation global script 705 (e.g., vc_setup.py) which are used to provision a license workflow class context manager 707. The license workflow class context manager 707 implements license validation functionality 771 for a VC license class, a singleton class, and/or a singleton instance 773 based on a set of input arguments 709 (e.g., action, module, job identifier (ID), etc.).

The technical solutions described herein provide various technical advantages, including in providing a self-managed worker. When working in distributed system clusters, any given IT asset in the cluster (e.g., any arbitrary one of the IT assets in the cluster) can act as a service configuration node which means that the given IT asset can perform configuration operations for other IT assets in the cluster through a local network interconnecting the IT assets in the cluster. Consider, for example, a new IT asset which joins a given cluster. Any other IT asset in the given cluster may act as a service configuration node to automatically configure the new IT asset (e.g., using RESTful API requests) with its data. The technical solutions also advantageously do not rely on "master" control for configuration of IT assets. The technical solutions do not require any master node for performing configuration operations. Any IT asset can perform configuration operations (e.g., as a crontab job) to realize backup/restore or other configuration operations automatically. The technical solutions also advantageously provide a replacement for DevOps. A DevOps tool like salt could use a "one command" approach to do IT asset configuration or deployment, in place of writing complex salt SLS files.

The technical solutions in some embodiments provide a RESTful solution for realizing automated configuration inside IT assets of distributed systems, as well as automated configuration of IT assets which are not part of distributed systems. An RDC solves cross-layer and component configuration workflows, while an SRE is used to split workflow logical configuration from configuration or user data to solve issues where the logical workflow configuration and the configuration or user data are blended. A VC provides validation functionality as well as functionality for handling sensitive data. The technical solutions in some embodiments thus realize a self-managed approach for backup/restore and other configuration operations, without relying on a master control module. The technical solutions can thus be used as a replaceable configuration route for any DevOps tools.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for self-managed configuration of IT assets in an IT environment will now be described in greater detail with reference to FIGS. 8 and 9. Although described in the context of system 100, these platforms may also be used to implement at least portions of other information processing systems in other embodiments.

Figure 8:
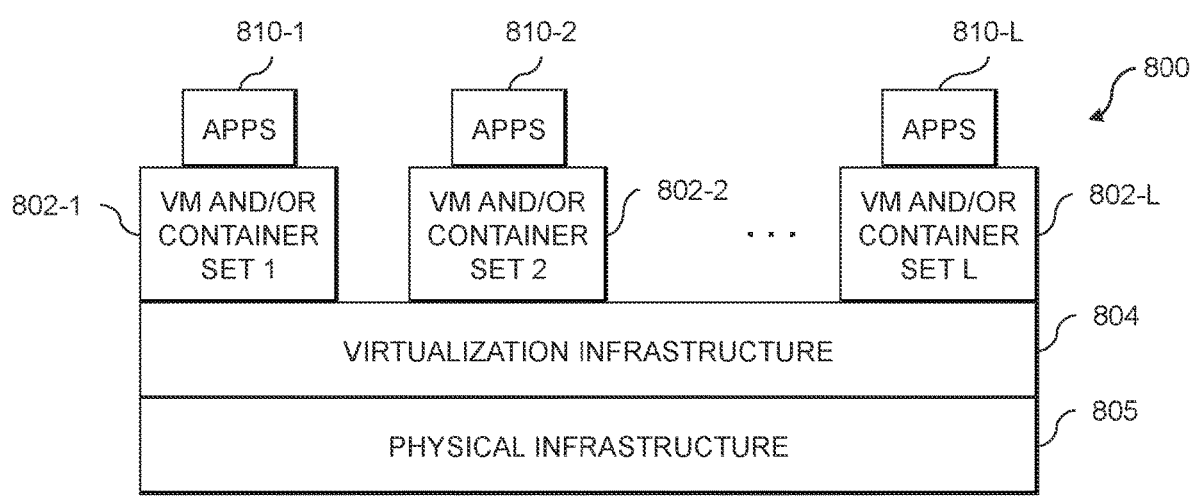
FIGS. 8 and 9 show examples of processing platforms that may be utilized to implement at least a portion of an information processing system in illustrative embodiments.
Figure 9:
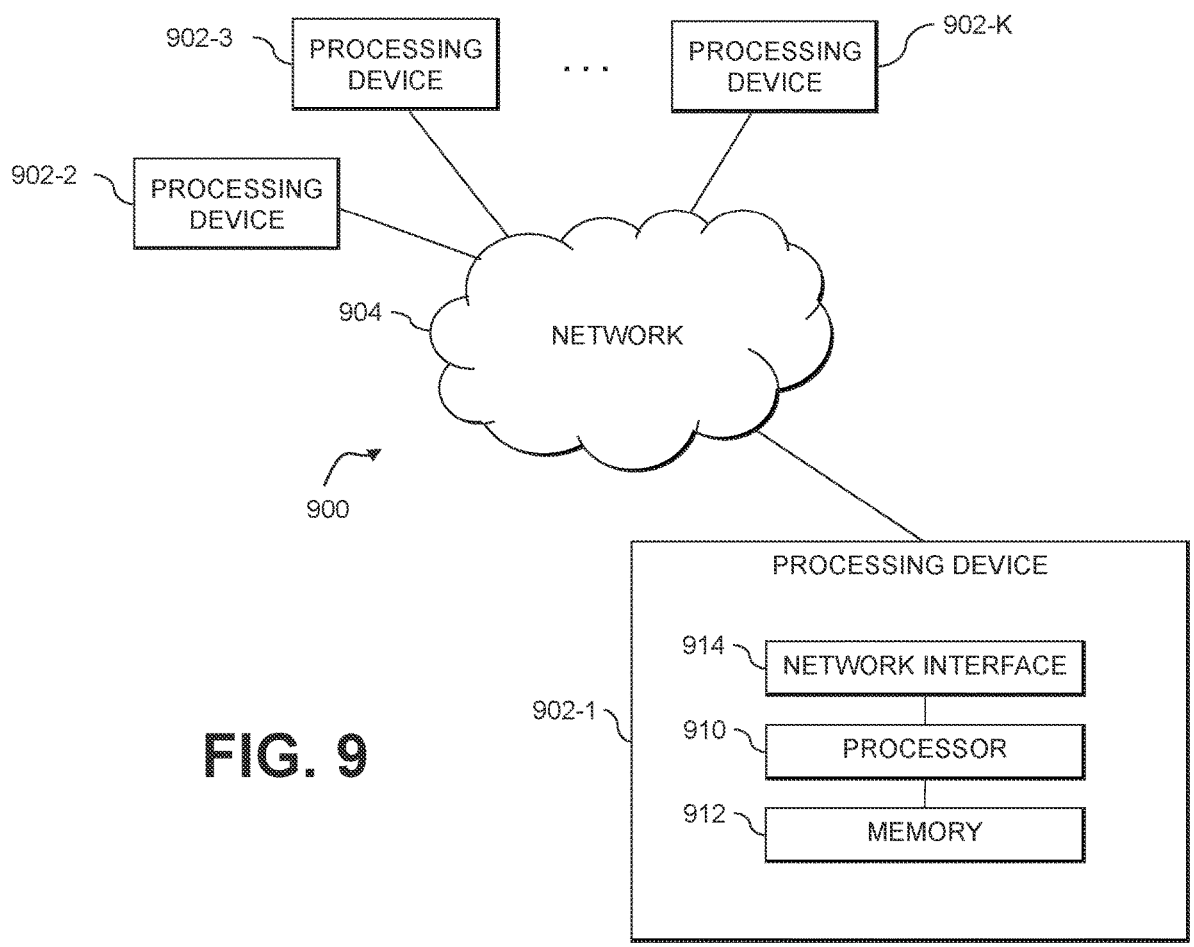

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for self-managed configuration of IT assets in an IT environment as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, information technology assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured:
        to deploy, at a given one of a plurality of information technology assets in an information technology infrastructure environment, an instance of a self-managed information technology asset configuration tool;
        to determine, utilizing the instance of the self-managed information technology asset configuration tool deployed on the given information technology asset, a logical dispatch order for performing configuration operations for at least one of (i) the given information technology asset and (ii) one or more other ones of the plurality of information technology assets in the information technology infrastructure environment, wherein the logical dispatch order operates recursively across two or more levels of a processing hierarchy; and
        to perform, utilizing the instance of the self-managed information technology asset configuration tool deployed on the given information technology asset, the configuration operations in accordance with the determined logical dispatch order.

2. The apparatus of claim 1 wherein the given information technology asset comprises an arbitrary one of the plurality of information technology assets in the information technology infrastructure environment.

3. The apparatus of claim 2 wherein one or more additional instances of the self-managed information technology asset configuration tool are deployed on one or more other arbitrary ones of the plurality of information technology assets in the information technology infrastructure environment.

4. The apparatus of claim 1 wherein the plurality of information technology assets are part of a distributed system cluster, and wherein the configuration operations are performed over a local network interconnecting the plurality of information technology assets in the distributed system cluster.

5. The apparatus of claim 1 wherein the configuration operations comprise, for said at least one of (i) the given information technology asset and (ii) the one or more other ones of the plurality of information technology assets in the information technology infrastructure environment, a restore configuration operation for provisioning a configuration on said at least one of (i) the given information technology asset and (ii) the one or more other ones of the plurality of information technology assets in the information technology infrastructure environment.

6. The apparatus of claim 5 wherein the logical dispatch order for the restore configuration operation operates recursively from a lowest one of the two or more levels of the processing hierarchy to a highest one of the two or more levels of the processing hierarchy.

7. The apparatus of claim 1 wherein the configuration operations comprise, for said at least one of (i) the given information technology asset and (ii) the one or more other ones of the plurality of information technology assets in the information technology infrastructure environment, a delete configuration operation for removing a configuration previously provisioned on said at least one of (i) the given information technology asset and (ii) the one or more other ones of the plurality of information technology assets in the information technology infrastructure environment.

8. The apparatus of claim 7 wherein the logical dispatch order for the delete configuration operation operates recursively from a highest one of the two or more levels of the processing hierarchy to a lowest one of the two or more levels of the processing hierarchy.

9. The apparatus of claim 1 wherein the logical dispatch order operates recursively across the two or more levels of the processing hierarchy utilizing a Depth First Search Recursion (DFSR) algorithm.

10. The apparatus of claim 1 wherein the two or more levels of the processing hierarchy comprise, for a specified type of information technology asset:
    a first level specifying a first logical dispatch sequence for two or more base system components, each of the two or more base system components affecting overall behavior of the specified type of information technology asset;
    a second level specifying a second logical dispatch sequence for two or more domains, the two or more domains each comprising one or more domain system components, the two or more domains comprising at least a first domain having one or more dependencies with at least a second domain; and
    a third level specifying a third logical dispatch sequence for two or more modules, each of the two or more modules being associated with at least one of the domain system components.

11. The apparatus of claim 10 wherein the first, second and third logical dispatch sequences are defined in JavaScript Object Notation (JSON) setup files.

12. The apparatus of claim 10 wherein the third logical dispatch sequence specifies, for a given one of the two or more modules, that configuration data coming from one or more of the domain system components associated with the given module be processed in accordance with a set of Representational State Transfer (RESTful) request schema rules for reconstructing user data to instantiate a configuration of the given module.

13. The apparatus of claim 10 wherein the third logical dispatch sequence specifies, for a given one of the two or more modules associated with two or more domain system components, utilization of idempotent processing operations allowing reentry configuration to a same entry point of the given module for each of the two or more domain system components.

14. The apparatus of claim 1 wherein performing the configuration operations in accordance with the determined logical dispatch order comprises:
identifying one or more components of a system configuration comprising sensitive data, wherein the sensitive data comprises at least one of license data and encrypted data; and
validating the identified one or more components of the system configuration prior to processing the identified one or more components of the system configuration as specified in the determined logical dispatch order.

15. A computer program product comprising a non-transitory processor-readable storage medium having stored therein program code of one or more software programs, wherein the program code when executed by at least one processing device causes the at least one processing device:
to deploy, at a given one of a plurality of information technology assets in an information technology infrastructure environment, an instance of a self-managed information technology asset configuration tool;
to determine, utilizing the instance of the self-managed information technology asset configuration tool deployed on the given information technology asset, a logical dispatch order for performing configuration operations for at least one of (i) the given information technology asset and (ii) one or more other ones of the plurality of information technology assets in the information technology infrastructure environment, wherein the logical dispatch order operates recursively across two or more levels of a processing hierarchy; and
to perform, utilizing the instance of the self-managed information technology asset configuration tool deployed on the given information technology asset, the configuration operations in accordance with the determined logical dispatch order.

16. The computer program product of claim 15 wherein the plurality of information technology assets are part of a distributed system cluster, and wherein the configuration operations are performed over a local network interconnecting the plurality of information technology assets in the distributed system cluster.

17. The computer program product of claim 15 wherein the two or more levels of the processing hierarchy comprise, for a specified type of information technology asset:
a first level specifying a first logical dispatch sequence for two or more base system components, each of the two or more base system components affecting overall behavior of the specified type of information technology asset;
a second level specifying a second logical dispatch sequence for two or more domains, the two or more domains each comprising one or more domain system components, the two or more domains comprising at least a first domain having one or more dependencies with at least a second domain; and
a third level specifying a third logical dispatch sequence for two or more modules, each of the two or more modules being associated with at least one of the domain system components.

18. A method comprising:
deploying, at a given one of a plurality of information technology assets in an information technology infrastructure environment, an instance of a self-managed information technology asset configuration tool;
determining, utilizing the instance of the self-managed information technology asset configuration tool deployed on the given information technology asset, a logical dispatch order for performing configuration operations for at least one of (i) the given information technology asset and (ii) one or more other ones of the plurality of information technology assets in the information technology infrastructure environment, wherein the logical dispatch order operates recursively across two or more levels of a processing hierarchy; and
performing, utilizing the instance of the self-managed information technology asset configuration tool deployed on the given information technology asset, the configuration operations in accordance with the determined logical dispatch order;
wherein the method is performed by at least one processing device comprising a processor coupled to a memory.

19. The method of claim 18 wherein the plurality of information technology assets are part of a distributed system cluster, and wherein the configuration operations are performed over a local network interconnecting the plurality of information technology assets in the distributed system cluster.

20. The method of claim 18 wherein the two or more levels of the processing hierarchy comprise, for a specified type of information technology asset:
a first level specifying a first logical dispatch sequence for two or more base system components, each of the two or more base system components affecting overall behavior of the specified type of information technology asset;
a second level specifying a second logical dispatch sequence for two or more domains, the two or more domains each comprising one or more domain system components, the two or more domains comprising at least a first domain having one or more dependencies with at least a second domain; and
a third level specifying a third logical dispatch sequence for two or more modules, each of the two or more modules being associated with at least one of the domain system components.

* * * * *